June 26, 1973 P. FORTESCUE 3,741,867
CONTROL ROD DRIVE SYSTEM
Filed June 15, 1971 4 Sheets-Sheet 2

INVENTOR
PETER FORTESCUE

Fitch, Even, Tabin, & Luedeka
ATTYS.

INVENTOR
PETER FORTESCUE

INVENTOR
PETER FORTESCUE

United States Patent Office 3,741,867
Patented June 26, 1973

3,741,867
CONTROL ROD DRIVE SYSTEM
Peter Fortescue, La Jolla, Calif., assignor to
Gulf Oil Corporation, Pittsburgh, Pa.
Filed June 15, 1971, Ser. No. 153,182
Int. Cl. G21c 7/20
U.S. Cl. 176—36 S                    10 Claims

ABSTRACT OF THE DISCLOSURE

A control rod drive system for a nuclear reactor is described in which a flywheel is used to absorb kinetic energy of the control rod and associated elements near the end of a scram stroke. In this manner, braking of the control rod is accomplished without producing undue stress therein and in the associated elements.

---

The present invention relates to a control rod drive system for a nuclear reactor and, more particularly, to such a system which is capable of controlling the position of the control rod during normal operation and which is also capable of moving the control rod into the reactor core in the event of emergency scramming of the reactor.

The use of control rods for regulating the power output of a nuclear reactor and for emergency scramming or shutting down the nuclear reactor, is well known. Such control rods usually comprise movable elongated cylinders incorporating neutron absorbing materials. Generally, control rod drive systems include a reversible electric or hydraulic motor drive which is utilized to effect operating adjustments in the position of a control rod relative to the reactive core of the nuclear reactor. The control rod drive system may also have provision for rapidly advancing the control rod into the reactive core in response to a prearranged signal to effect emergency shut down or scramming of the reactor.

Some types of control rod drive systems have relied upon gravity in order to effect scramming of a control rod. Under some circumstances, the force of gravity may not be sufficient to insure proper insertion of a control rod at all times a scram is necessary. Accordingly, various expedients for effecting a positive drive of the control rod during scram conditions have been devised. Among these are hydraulic and pneumatic systems.

For safety reasons, it may be desirable to maximize the rate of scram insertion of a control rod from a working position. However, excessive velocity build up only aggravates energy dissipation problems and incurs general wear and tear on guidance elements unnecessarily. Therefore it is desirable that the rod scram stroke be composed of a minimal initial hesitation and a rapid and uniform acceleration followed by a final deceleration. The acceleration is selected to provide the required insertion rate and still not require an excessive deceleration rate. The deceleration rate depends upon the distance available for deceleration. In a fast reactor the insertion of several inches of all of the rods is sufficient to shut the reactor down. Therefore, within reason, the deceleration distance can be selected to give almost any deceleration rate desired.

Control rod drive systems have heretofore been advised utilizing various types of drives, such as hydraulic piston drives or screw type motor operated drives, for supporting and precisely positioning the control rods during normal operation. Moreover, hydraulic or pneumatic drive systems for effecting positive scram have heretofore been combined with such normal operation drive systems. Such previous combination drive systems have, however, not been entirely satisfactory.

For example, hydraulic systems require reliable and tight oil seals which, if they have to cover the full operating stroke, pose a considerable problem. An independent oil shock absorber, only engaged during final deceleration, reduces the seal problem but is difficult to design because of severe shock loading. In any hydraulic system, moreover, oil foaming presents a problem, especially where the reactor is gas cooled, since some coolant gases, at certain pressures, may be highly soluble in oil.

Other drive systems such as pneumatic or friction braked systems also encounter problems. For example, pneumatic systems require careful design to achieve critical damping at all conditions of pressure encountered during reactor operation. Failure to provide for proper operating pressures in a pneumatic system can lead to severe rebound of the control rod after scram. Friction damped systems are also unattractive because of unpredictability and because of the difficulty in insuring that a full stroke will occur at all times, especially in the case of scram from a partly inserted position.

Accordingly, it is an object of this invention to provide an improved control rod drive system for a nuclear reactor.

Another object of the invention is to provide a control rod drive system having provision for fine adjustment, positive drive scram, and satisfactory control rod deceleration at the end of scram travel.

Another object of the invention is to provide a highly reliable control rod drive system imparting to the control rod, during scram, a minimal initial hesitation, a rapid acceleration, and a final deceleration.

Other objects of the invention will become apparent to those skilled in the art from the following description, taken in connection with the accompanying drawings wherein.

Figure 1:
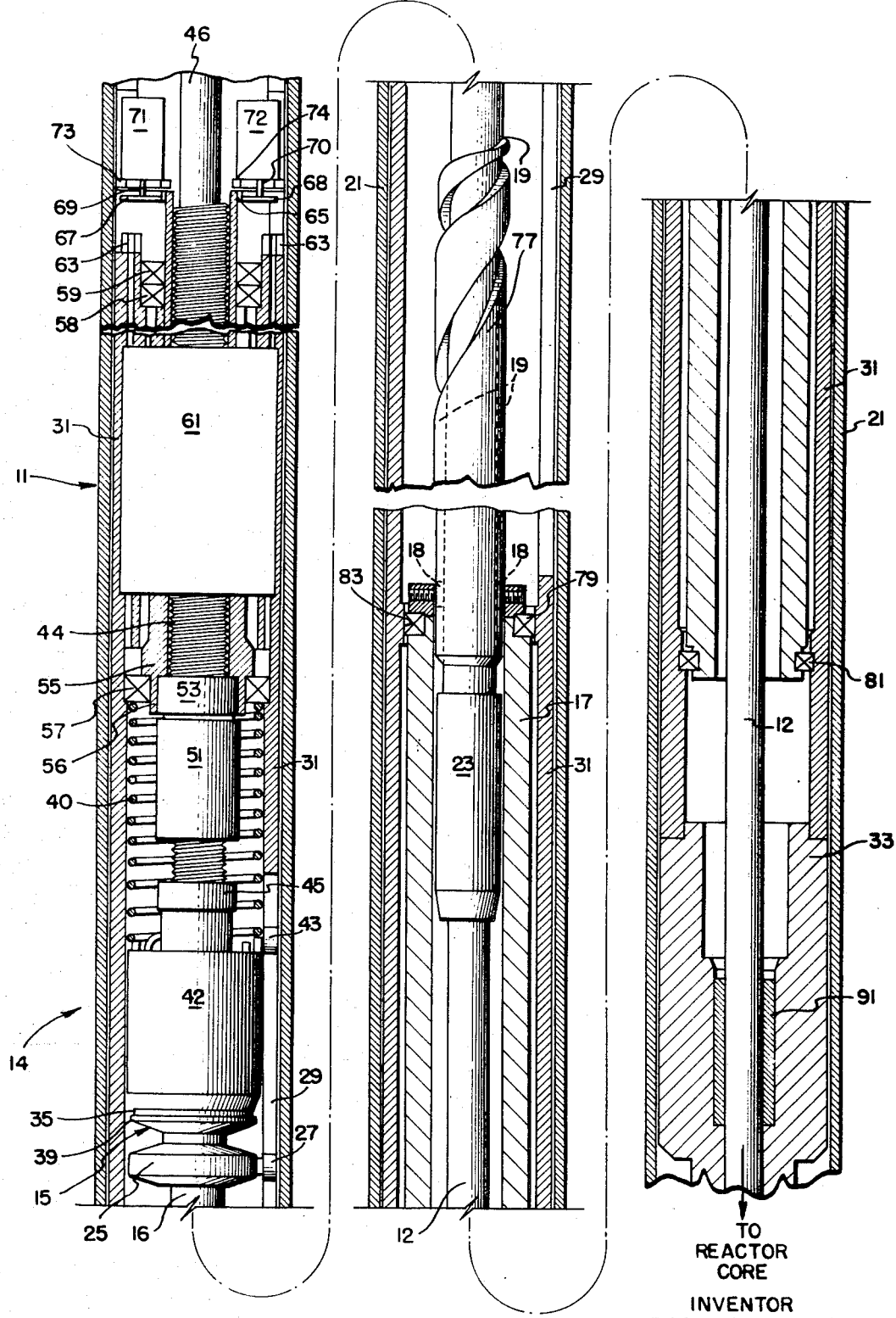
FIG. 1 is a full section side view illustrating a portion of a nuclear reactor having a control rod drive system therein constructed in accordance with the invention.

Very generally, the control rod drive system of the invention employs means 11 for supporting and adjusting a control rod 12 with respect to a reactor core (not shown). Means 14 are provided for coupling the control rod to the supporting and adjusting means. The coupling means include a latch 15 releasable in response to a scram signal to decouple control rod from the supporting and adjusting means. Rod means 16 interconnect the control rod to the latch and are movable axially with the control rod of predetermined distance toward the reactor core upon release of the latch. A flywheel 17 has a cam follower 18 thereon and is mounted for rotation about an axis which coincides with the axis of the rod means. The rod means include a cam track 19 thereon for engaging the cam follower. The cam track is shaped to impart torque to the flywheel through the cam follower toward the end of the predetermined distance of movement of the rod means to absorb the kinetic energy of the rod means and the control rod for braking same.

Referring now more particularly to FIG. 1, the control rod drive system of the invention is illustrated in connection with one form of reactor which includes a reactive core comprised of a plurality of fuel modules or boxes (not shown). The boxes contain suitable fuel rods (not shown) and are suitably positioned and supported within a prestressed concrete reactor vessel (not shown). The fuel module has a central interior passageway therein to permit the control rod 12 to be moved in and out of the reactor core for controlling the reactivity thereof. A reactor of this general design is shown and described in U.S. Pat. No. 3,423,388 assigned to the present assignee.

It is to be understood that, although the foregoing described reactor structure is of advantage under certain circumstances, other reactor structures may also utilize the invention to advantage. The described structure is set forth only as being illustrative of a particular reactor structure in which the invention may be used.

The prestressed concrete reactor vessel (not shown) has a penetration therein which is provided with a pressure housing 21 at its upper end of a suitable material such as stainless steel. Only part of the pressure housing 21 is shown in the drawings. The lower end of the pressure housing is not shown and is supported by the reactor pressure vessel. The control rod 12 is movable through the unillustrated penetration in the reactor vessel and into the core of the reactor. As illustrated in FIG. 1, control rod is withdrawn fully from the reactor core. A similar type of reactor having a control rod drive is shown in U.S. Pat. No. 3,448,066, assigned to the present assignee.

The control rod 12 is coupled to the supporting and adjusting means 11 by the rod means 16 which, in the illustrated embodiment, comprises a single rod connected to the upper end of the control rod by a suitable coupler 23 and extending axially within the penetration in the reactor vessel. The upper end of the rod 16 is connected to the latch 15, described below. The upper end of the rod 16 also has an annular collar 25 thereon from which three guide wheels 27 project at 120° intervals (only one guide wheel is shown). The guide wheels 27 move in axial slots 29 (only one slot is shown) in the wall of the removable housing 31. The removable housing 31 is supported within the pressure housing 21 by a suitable support means 33 which forms part of the support for the fuel module, not shown. The upper end of the removable housing supports the supporting and adjusting means 11 as will be explained more fully below. The entire assembly of the removable housing 31 and the supporting and adjusting means 11 is removable from the penetration liner by manipulation of the means, not shown, which secure and support the support means 33 within the penetration liner. A specific arrangement for accomplishing this is described more fully in the aforesaid U.S. Pat. No. 3,448,006.

The illustrated magnetic latch which connects the rod 16 to the supporting and adjusting means 11 includes a pair of separable elements 35 and 39. The latch also includes an electromagnetic coil unit 42 which is energized through a suitable electrical connection such as a coiled electrical cord 40. Upon energization of the coil unit, the elements 35 and 39 are held securely together by magnetic force. With the magnetic latch thus engaged, the control rod 12 is rigidly coupled through the rod 16 to the supporting and adjusting means 11. The upper end of the coil unit 42 carries three guide rollers 43 (only one of which is shown) which move in the vertical slots 29 (only one of which is shown). The rollers 27 and 43 thus prevent rotation of the coil unit 42 and the rod 16.

In order to accomplish vertical movement and positioning of the control rod 12 in a predetermined manner during normal reactor operation, the supporting and adjusting means incorporate a screw drive mechanism. The screw drive mechanism includes a drive screw 44 which is secured at its lower end, to a collar 45 on the upper end of the coil unit 42 and which is prevented from rotating by the guide rollers 27 and 43. The upper end of the screw 44 is secured to a rod 46 which serves to enable manipulation of the means (not shown) which secure and support the support means 33 and withdrawal of the fuel module, not shown, and control rod drive assembly from the reactor.

A ball nut 51 is threadably engaged on the screw 44. The ball nut is provided with a drive collar 53 at its upper end, the drive collar being free of the screw 44. A drive sleeve 55 is journalled within the removable housing 31 in bearings 57, 58 and 59 suitably secured to the removable housing. The drive sleeve has a drive ring 56 depending therefrom and secured to the drive collar 53. The drive collar is thereby secured to and rotatably driven by the drive sleeve 55. The drive sleeve is powered by a motor 61 mounted within the removable housing 31 by bolts 63. When the motor 61 is energized, the drive sleeve 55 rotates, turning the ball nut 51 by rotating the collar 53. The screw 44 is thereby displaced vertically in a direction dependent upon the direction of rotation of the motor 61.

The upper end of the drive sleeve 55 is provided with an annular gear 65. The gear 65 meshes with a pair of gears 67 and 68 attached to the downwardly depending shafts 69 and 70 of angular position encoders 71 and 72. The angular position encoders 71 and 72 are mounted on brackets 73 and 74 which extend inwardly from the walls of the removable housing 31. The wall of the removable housing is cut away in the regions of the position encoders 71 and 72 to provide clearance. The position encoders produce signals which indicate the angular position of the drive sleeve 55 and hence the vertical position of the control rod 12.

During scram, the magnetic latch 15 is released to cause the control rod 12 and support rod 16 to fall, moving the control rod into the reactor core. In accordance with the invention, the control rod drive system accomplishes braking of the control rod 12 at the end of the scram stroke by transferring the energy of the falling rod and its associated elements into rotation of the flywheel 17.

The support rod 16 has an enlarged diameter section 77 which has a pair of diametrically opposed cam tracks 19 machined therein. The generally tubular flywheel 17 is mounted in a pair of axially spaced bearings 79 and 81. The bearings 79 and 81 are contained within the removable housing 31. The outer race of the bearing 79 is mounted by suitable means, not shown, to a slight annular projection 83 on the inner wall of the removable housing 31. Similarly, the outer race of the bearing 81 is mounted to the inner surface of the removable housing 31 by suitable means, not shown. The inner race of each of the bearings 79 and 81 is mounted to the flywheel 17 in annular recesses therein by suitable means, not illustrated.

The flywheel 17 is provided with the pair of cam followers 18 which project radially inward to engage with and ride in the cam tracks 19 on the support rod 16. The cam tracks are substantially parallel with the axis of the support rod for the major portion of their length, and are provided with curved portions near the upper ends. For reasons which are explained more fully below, the support rod 16 is of a diameter at the upper ends of the cam tracks to provide clearance between the cam followers 18 and the support rod in the region above the cam tracks. During normal periods of reactor operation, the position of the control rod 12 is adjusted by operating the motor 61, and the cam followers 18 move in the parallel straight portions of the cam tracks 19.

In the event of an emergency situation in the reactor operation whereupon immediate shut down of the reactor is necessary, rapid control rod insertion is initiated by a signal emanating from a suitable scram signal source not shown. The scram signal source may be one or several of various detection instruments which continually monitor the reactor for indications of abnormal operation. Instruments for this purpose are well understood in the art. Upon the initiation of the scram signal, suitable switch means, not illustrated, cause the magnetic latch 15 to be de-energized. With a holding force no longer available between the plate elements 35 and 39, the rod 16 is free to move downwardly free of the latch 15.

In the illustrated embodiment, the impetus for inserting the control rod into the core during scram is gravitational, with an initial impulse being provided by a pair of coil springs, not shown, mounted within the housing of the coil unit 42 to provide a downward bias force on the plate 39. Upon release of the latch 15, the springs assist gravity in providing initial acceleration of the control rod towards the core.

Once the magnetic latch 15 is released upon initiation of a scram, the control rod 12 will accelerate and be driven into the core (not shown). It is desirable that the control rod, and its associated elements, which are ordinarily quite heavy, be stopped in a manner that avoids high impact forces on the various structural elements. The straight portions of the cam tracks 19 are selected to be of a length to provide the desired degree of initial control rod insertion. Once the cam followers 18 reach the curved portions of the cam tracks, and since the support rod 16 is restrained from turning by the rollers 27, the cam tracks exert a force on the cam followers resulting in a torque being applied to the flywheel. Preferably, the curve of the cam tracks is selected to provide a constant total force on the cam followers. As explained more fully below, the use of a linear variation of deceleration with distance may most closely achieve this result.

Figure 2:
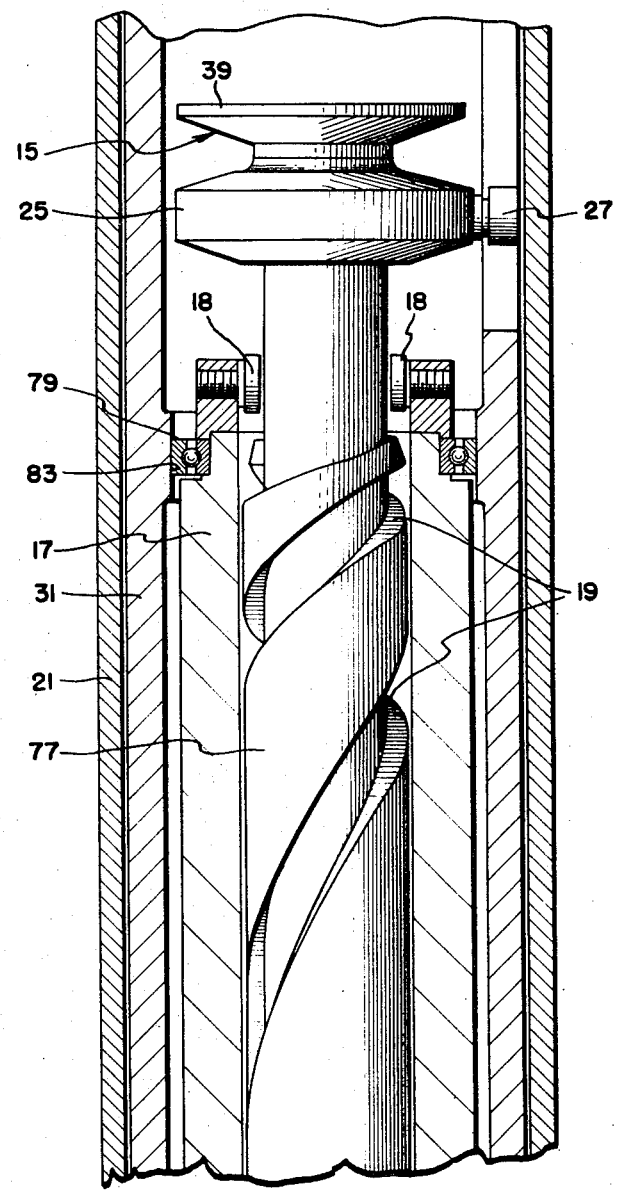
FIG. 2 is an enlarged sectional view of portions of the control rod drive system of the invention illustrated in FIG. 1.

In order to allow the flywheel 17 to rotate freely after scram is completed and thus dissipate the braking energy through frictional losses, the cam tracks are terminated at a distance which allows the cam followers to move clear thereof just prior to completion of the distance of movement of the control rod and the support rod. The relative positions of cam tracks and cam follows at the end of the scram stroke may be seen in FIG. 2. Preferably, no less than 90% of the energy of the falling control rod and support rod is absorbed by the flywheel prior to termination of the cam tracks. Moreover, to provide suitable clearance, it is preferable that no greater than 95% of the energy be absorbed. A greater extraction of energy means that the cam tracks would have to be curved further and thus more closely to the horizontal. Thus a practical limit is reached before difficulty is encountered in achieving clearance of the cam followers from the cam tracks. Once the cam followers exit from the tops of the cam tracks, the clearance between the rod 16 and the cam followers allows the cam followers to move free of the support rod while the rod moves the remaining distance. In order to absorb the energy remaining, a suitable shock absorber sleeve 91 (FIG. 1) is provided to engage the lower edge of the coupler 23. The shock absorber 91 may be formed from a mesh of steel wires to absorb the energy without oscillation.

FIGS. 3 to 8 represent various conditions present in a control rod drive system constructed in accordance with the invention and having various specific parameters. The specific system described herein is intended by way of example only and the invention is not limited thereto. The specific system described is for a total stroke distance of 3 feet with an initial spring assistance force equal to the weight of the control rod for a distance of 0.3 feet. The flywheel is selected to have the same weight as the control rod and to have a radius of gyration equal to 1.9 inches. The maximum deceleration in the system is 4.55 g. Assuming that a linear variation of deceleration with distance, in order to achieve constant force on the cam followers, a brake stroke distance of 1.19 feet is utilized.

Figure 3:
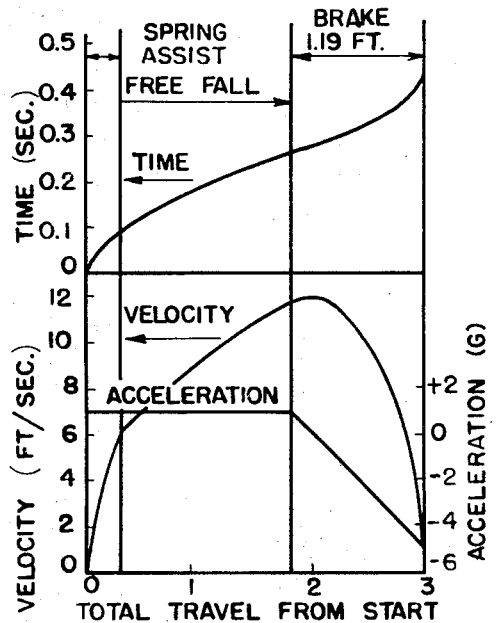
FIG. 3 is a graph illustrating the variation in velocity, acceleration, and time over the total distance of the control rod scram stroke.

Referring to FIG. 3, the rod velocity, time, and acceleration profiles are illustrated. It may be seen that variation in time with braking distance is almost linear except for a slight non-linearity at each end. The first segment of travel distance represents the distance during which the spring force is acting in addition to the force of gravity. The middle segment represents the free fall distance and the last segment represents the braking distance, previously mentioned as being 1.19 feet. It may be seen that the total insertion time is about 0.4 second, including the braking time, which is satisfactorily short for use in a fast reactor. Half insertion takes place in under 0.25 second and maximum velocity is limited to 12 feet per second. It will be seen that initial acceleration is constant but at a high level due to the spring assist, dropping to a slightly lower level during free fall, and then falling off linearly during braking distance. Velocity climbs rapidly during the initial spring assist period, slightly less rapidly to the maximum at the beginning of braking, and then declines rapidly after braking takes place.

Figure 4:
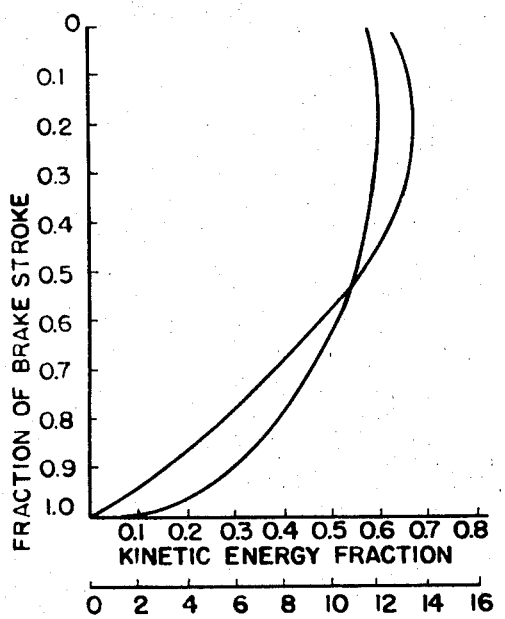
FIG. 4 is a graph illustrating the variation of velocity and kinetic energy over the total distance of the control rod scram stroke.

Referring to FIG. 4, variation in velocity and in the kinetic energy of the rod during the braking stroke, or the last 1.19 feet, are illustrated. The braking stroke is expressed in the plot as the fraction of the total stored energy of the rod prior to its release. As mentioned before, the cam track is terminated sufficiently before full transfer of energy to the flywheel in order to leave sufficient translational velocity to allow the cam followers to move out of the cam tracks at the stroke end and thus allow the flywheel to spin freely. This occurs somewhat between 0.1 and 0.5 in the kinetic energy fraction.

Figure 5:
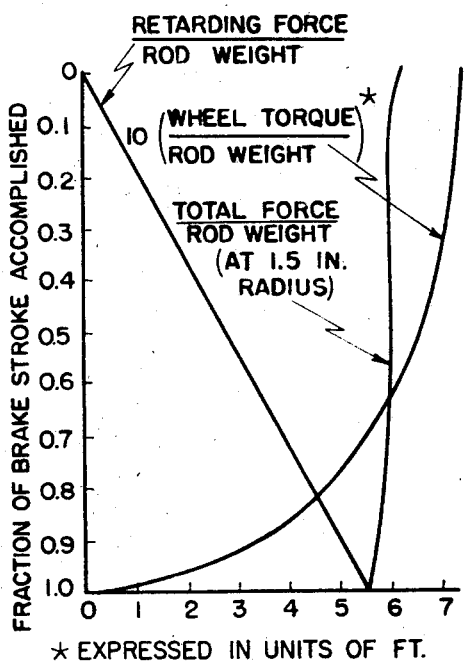
FIG. 5 is a graph illustrating the variation of force during braking on the cam followers in the system of the invention.

FIG. 5 illustrates the forces on the cam followers and their resultant. It may be seen that the resultant, represented by the total force, remains virtually constant at about six times the rod weight. From this, the structural requirements of the cam followers may be calculated readily.

Figure 6:
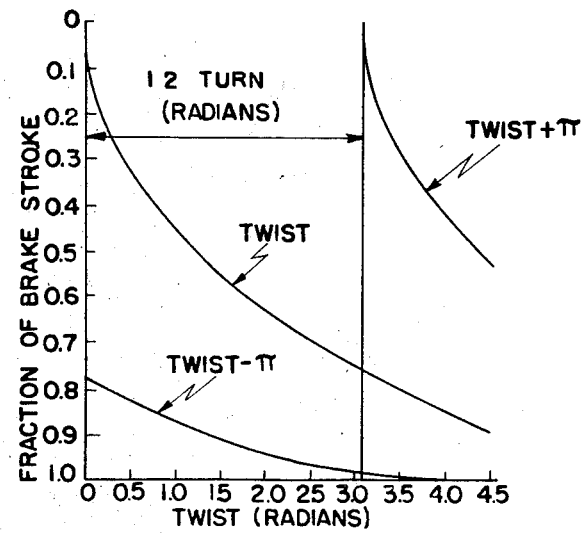
FIG. 6 is a graph illustrating the amount of twist imparted by the cam and cam followers in the illustrated embodiment during braking.

In FIG. 6, the theoretical helical path of the cam followers, in terms of the required twist versus vertical distance, is illustrated.

Figure 7:
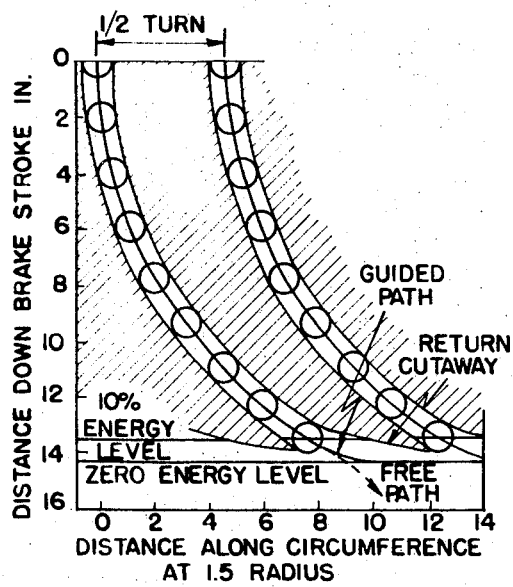
FIG. 7 is a projection illustrating the shape of the cam tracks employed in the illustrated embodiment of the invention.

In FIG. 7, the cam tracks are projected into a plane from the cylindrical surface of the rod and are shown at 1.5 inch radius. The use of 1 inch diameter rollers for the cam followers is assumed and the tracks are terminated after removing 90% of the rod energy. It may be seen that there is a slight cut-away at the end of the cam tracks. This is done in order to allow the cam followers to more easily re-enter the cam tracks when the control rod is to be removed from the scrammed position. To accomplish this, the motor is energized and the plate 35 lowered onto the plate 39 so that the latch 15 is re-engaged. The coil unit 42 is then energized and the plate 35 raised, raising the rod 16 and the control rod 12. In order to reduce wear on the cam followers, nylon or Teflon rollers of suitable design may be utilized. Details of the cam followers are not shown or described herein but such may be designed in accordance with techniques known to those skilled in the art.

Figure 8:
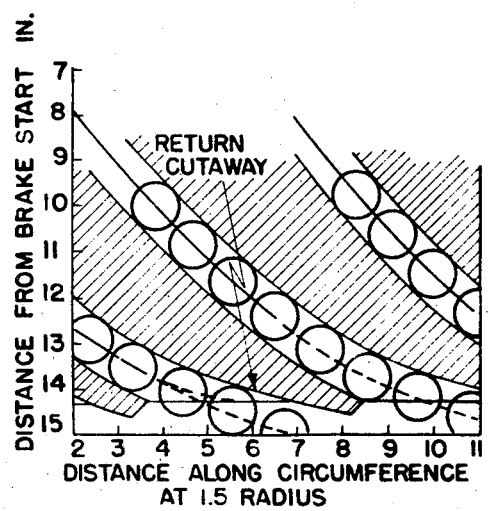
FIG. 8 is an enlarged view illustrating the ends of the cam tracks of FIG. 7.

Referring to FIG. 8, an enlarged view of the ends of the cam tracks is presented. In FIG. 8, the tracks are shown extended to remove 95% of the energy of the control rod and support rod. The cut-away portion of the ends of the cam tracks may be more readily seen in FIG. 8. In this figure, the path of the cam followers relative to the track is shown both during guidance and after leaving the tracks. This latter portion of the motion of the cam followers, neglecting further free acceleration, is simply tangential to the normal track at the point of its termination. In order to provide sufficient exit clearance for the cam followers so that they will avoid touching the top of the next succeeding cam track, the criterion of extracting 95% energy as a maximum is a practical limit. Because of the cut-away section provided on the back face of the inner cam track walls in the exit region, the cam followers may readily enter into their cam tracks irrespective of the flywheel starting position. There is one exception and that is when the flywheel stops in theoretically zero width dead center position. This may be readily avoided by installing a permanent magnet (not shown) in the flywheel or the surrounding region designed to prevent the flywheel from stopping at the dead center position.

It may therefore be seen that the invention provides an improved control rod drive system for a nuclear reactor in which fast insertion of the control rod is facilitated while providing initial braking thereof. The particular system is well suited to use in fast reactors wherein extremely rapid control rod insertion times may be necessary during scram conditions. More precise control rod positioning during normal operation is achieved by the ball screw drive.

Various modifications of the invention in addition to those shown and described herein will become apparent to those skilled in the art from the foregoing description and accompanying drawings. Such modifications are intended to fall within the scope of the appendant claims.

What is claimed is:

1. A control rod drive system for a nuclear reactor comprising, means for supporting and adjusting a control rod with respect to a reactor core, means for coupling the control rod to said supporting and adjusting means, said coupling means including a latch releasable in response to a scram signal to decouple the control rod from said supporting and adjusting means, rod means interconnecting the control rod to said latch and movable axially with the control rod a predetermined distance toward the reactor core upon release of said latch, a flywheel having a cam follower thereon and being mounted for rotation about an axis which coincides with the axis of said rod means, said rod means having a cam track thereon for engaging said cam follower, said cam track being shaped to impart torque to said flywheel through said cam follower toward the end of the predetermined distance of movement of said rod means to absorb the kinetic energy of said rod means and the control rod for braking same.

2. A control rod drive system according to claim 1 wherein said cam track terminates a distance prior to the end of movement of said rod means whereat at most 95% of the kinetic energy of said rod means and control rod is absorbed by said flywheel, to thereby allow said flywheel to rotate freely.

3. A control rod drive system according to claim 2 wherein said cam track terminates a distance prior to the end of movement of said rod means whereat at least 90% of the kinetic energy of said rod means and control rod is absorbed by said flywheel.

4. A control rod drive system according to claim 2 wherein shock absorbing means are provided for absorbing the remaining kinetic energy of said rod means and control rod after absorption of kinetic energy thereof by said flywheel.

5. A control rod drive system according to claim 1 wherein said rod means include a pair of diametrically opposite cam tracks, and wherein said flywheel is provided with a pair of cam followers thereon, one for each cam track.

6. A control rod drive system according to claim 5 wherein said cam tracks are substantially parallel with the axis of said rod means for the major portion of their length, and are provided with curved portions near their ends opposite the starting position of said cam followers.

7. A control rod drive system according to claim 5 wherein said rod means are provided with a portion of a diameter at the ends of said cam tracks to clear said cam followers to allow said cam followers to move freely with said flywheel.

8. A control rod drive system according to claim 5 wherein said cam tracks include widened portions at the end thereof to permit said cam followers to readily re-enter said cam tracks when said control rod is to be retrieved.

9. A control rod drive system according to claim 6 wherein said cam tracks are shaped to provide a substantially constant force on said cam followers.

10. A control rod drive system according to claim 6 wherein fixed guide means are positioned to ride in the portions of said cam tracks parallel to the axis of said rod means to prevent rotation of said rod means during axial movement thereof.

References Cited

UNITED STATES PATENTS 3,059,727  10/1962  Fuchs _____ 188—129

FOREIGN PATENTS 1,154,687  6/1969  Great Britain _____ 176—36 R

CARL D. QUARFORTH, Primary Examiner

H. E. BEHREND, Assistant Examiner

U.S. Cl. X.R.

188—1 B, 129